Jan. 8, 1952

I. H. SWIFT 2,581,456

COMPUTING AMPLIFIER

Filed Jan. 14, 1949

INVENTOR.
IRVIN H. SWIFT
BY
M. C. Hayes
ATTORNEY

Patented Jan. 8, 1952 2,581,456

UNITED STATES PATENT OFFICE 2,581,456

COMPUTING AMPLIFIER

Irvin H. Swift, Grant City, Mo.

Application January 14, 1949, Serial No. 71,002

9 Claims. (Cl. 179—171)

(Granted under the act of March 3, 1883, as amended April 30, 1928; 370 O. G. 757)

This invention relates to operational amplifiers, or analogue computers, used primarily for the electrical solution of mathematical equations. While the amplifier of this invention may be used for other purposes, it is particularly adapted for the analogous electrical performing of mathematical operations, such as summation, integration, differentiation, or combinations of such operations.

Operational amplifiers or analogue computers have been defined as "amplifiers whose gain functions are such as to enable them to perform certain useful operations, such as summation, integration, differentiation, or a combination of such operations." For an extended discussion of such amplifiers, or computers, reference is made to an article entitled "Analysis of Problems in Dynamics by Electronic Circuits," Ragazzini et al., page 444 of the May, 1947 issue of the Proceedings of the IRE. Operational amplifiers embody a number of impedances, generally two, which will be called hereinafter "analogue impedances," because they are of such value as to correspond to terms in mathematical equations, particularly equations including differentials and integrals. By proper selection of these analogue impedances in the operational amplifier circuit, it is possible to apply, to a predetermined input point in the amplifier, the independent variables in the equation, and to derive from suitable output terminals of the amplifier such dependent variables as are desired.

As explained in the above referenced article, it is desirable that the gain of the operational amplifier be as high as possible in order to give maximum computational accuracy. In the several specific circuits illustrated in the referenced article, this gain is attained by employing a relatively large number of amplifying stages in the amplifier. This, however, has the disadvantage of introducing considerable drift as the tube characteristics change, and of requiring increasingly higher plate voltages as the stages are cascaded.

It is an object of this invention to provide an operational amplifier of increased stability, accuracy, and of simplified construction.

It is another object of this invention to provide a simple, stable, direct current amplifier, using degenerative, or negative, feedback, for computational purposes.

It is another object of this invention to provide an operational amplifier having extremely high gain in a small number of stages.

It is a further object of this invention to eliminate the disadvantages of an amplifier having many stages, such as drifting and high plate voltage requirement, by the provision of high gain means in a direct current amplifier having a small number of stages.

It is a still further object of this invention to provide an operational amplifier which is stable in its operating characteristics, which has an exceptionally low output impedance, and which will provide computational accuracy of plus or minus one per cent.

It is an additional object of the instant invention to provide an operational amplifier, or analogue computor, having simple and convenient means for adjusting the input reference level, and means for stabilizing such level at zero, or ground, potential.

It is a still further object of the instant invention to provide an operational amplifier capable of accepting input signals both positive and negative with respect to ground, with equal accuracy of computational results.

Objects other than those outlined above, and many of the attendant advantages of this invention, will be readily appreciated as the same becomes better understood by reference to the following description.

In accordance with the instant invention, the high gain requisite for proper operation of the amplifier is achieved, not by cascading several stages, but by employing regenerative, or positive, feedback from an output portion of the amplifier to an input portion, so that extremely high gain in the order of 5,000, may be attained with simplicity and stability. Inasmuch as one of the analogue impedances is connected between the output terminal and the input terminals of the amplifier in degenerative, or negative, feedback fashion, there is no danger of instability, because of the degeneration introduced by such analogue impedance. Therefore, the regenerative or positive feedback, introduced in accordance with the instant invention, may be very high in magnitude; it is theoretically possible by proper choice of the feed-back resistor or impedance to obtain infinite gain and thus attain absolutely perfect computational accuracy. As a practical matter, however, it will be understood that variation in tube characteristics at different operating levels will make possible the attainment of perfect computation at only one point. It has been found in practice that over the operating range of an amplifier constructed in accordance with the instant invention, a computational accuracy of plus or minus one per cent may be readily attained.

The operational amplifier, or analogue computer, of the instant invention comprises a suitable amplifier circuit, having the first of the two analogue impedances connected to the input terminal, i. e. the grid of the first tube of the amplifier. The second analogue impedance is connected between the output terminal of the amplifier and the input terminal thereof, to feed back degenerative or negative feed-back signals from the output to the input of the amplifier. In accordance with the instant invention, very high gain without the complication of added amplifier stages is attained by the provision of a positive feed-back resistor connected to feed back regenerative signals from a suitable output portion of the amplifier to a suitable input portion, thereby effecting a gain which approaches infinity.

More particularly, the operational amplifier of the instant invention comprehends a first tube such as a high gain pentode, the output from which is taken from the plate and applied to the grid of the next tube, which is connected in cathode follower fashion. Output from the amplifier is taken from the cathode of the second tube. The first analogue impedance is connected to the grid of the pentode, the other end of this impedance constituting the terminal into which input signals are fed. The second analogue impedance is connected from the cathode of the second tube to the grid of the pentode, so that negative or degenerative feedback is effected. In accordance with the instant invention, a positive feed-back impedance, such as a feed-back resistor, is connected between the cathodes of the two tubes, thereby effecting regenerative or positive feedback, and resulting in very high gain for the amplifier as a whole.

As will be understood by reference to the abovementioned Ragazzini article, the operational accuracy of the computer is dependent not only on high gain, but also on the ability to hold the grid of the pentode (i. e. the midpoint between the two analogue impedances) at a fixed voltage reference level, usually taken to be ground, or zero potential. This is achieved in simple and precise manner in the instant invention by returning the cathode of the first tube, or pentode, through a resistor to an adjustable source of low voltage. By raising or lowering the cathode voltage slightly, the pentode grid may be correspondingly adjusted until it resides exactly at zero or ground potential. The computational analogy between the circuit and the mathematical equation to be solved is thus greatly simplified.

Another feature characterizing the instant invention is the provision of means whereby the input voltage may swing between positive and negative limits, with equal facility on the part of the amplifier to correctly respond to such excursions. This is effected by introducing a voltage dropping impedance between the plate output of the first tube and the grid of the second tube, this means preferably assuming the form of a nonlinear impedance such as a glow lamp or tube having a substantially constant voltage drop.

A preferred embodiment of the instant invention will now be described with reference to the accompanying drawings, showing certain ways in which the instant invention may be practiced.

Figures 1, 2:
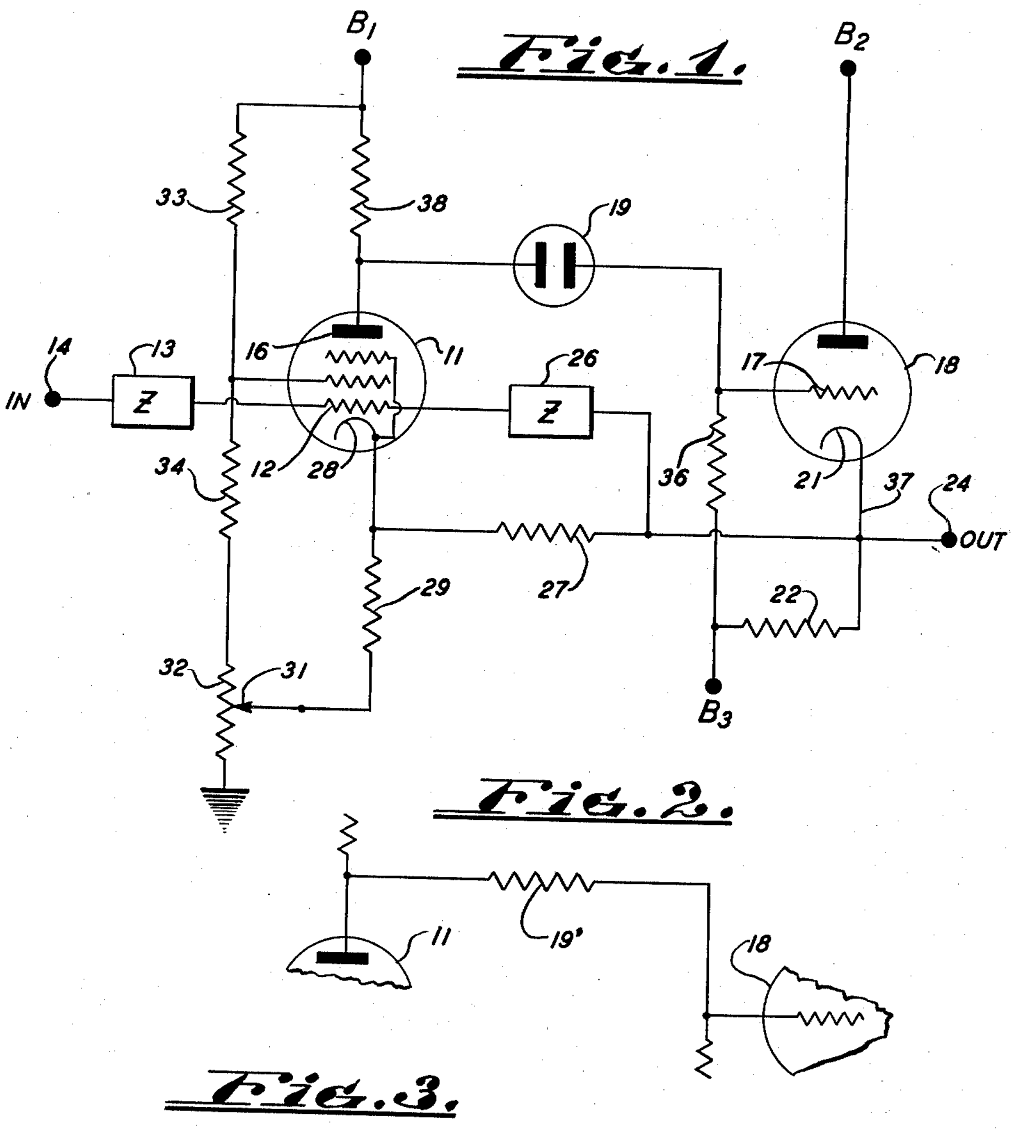
Fig. 1 shows the entire circuit embodying the invention.
Figs. 2 and 3 illustrate two possible variations in the circuit of Fig. 1.

Referring to the drawing, 11 represents a high gain tube, such as a pentode, having a control grid 12, connected to an analogue impedance 13, the other end of which constitutes the terminal 14 for the input signal to the amplifier. From the plate 16 of the pentode 11 its output is applied to the grid 17 of a tube 18 through a voltage dropping impedance such as a glow tube 19. The tube 18 is connected in cathode follower fashion so that the signal received on the grid 17 causes the potential at the cathode 21 to oscillate about a fixed negative potential derived by returning the cathode 21 to a negative source of voltage B3 thru a resistor 22. The amplifier output terminal 24 is connected directly to the cathode 21.

To attain stability and also to effectuate the computing function of the amplifier, degenerative signals are applied to an input point of the amplifier, by connecting a second analogue impedance 26 between the cathode 21 of the tube 18 and the grid 12 of the tube 11. As explained in the Ragazzini article referenced hereinbefore, if the grid 12 is held at a constant potential, the ratio between the voltage applied to the terminal 14 and the voltage derived from the output terminal 24 is then dependent only on the two impedances 13 and 26, and entirely independent of the other characteristics of the amplifier. Upon the constancy of this grid potential depends the freedom of the circuit operation from amplifier characteristics other than the values of the impedances 13 and 26. In order that the potential on the grid 12 of the tube 11 remain substantially constant during operation of the amplifier, the amplifier gain must be high.

To obtain the requisite high amplifier gain, for maintenance of substantial constancy of potential at the grid 12, there is provided in accordance with the instant invention a regenerative, or positive, feed-back impedance in the form of a resistor 27 connected from the cathode 21 of the tube 18 back to the cathode 28 of the pentode 11. By suitable choice in the value of the resistor 27, the gain of the amplifier may be made extremely high, so that the voltage on the grid 12 remains substantially constant over the operating range of the signals applied to the terminals 14.

To adjust the input reference level, i. e. the voltage at the grid 12, which level is preferably substantially zero, or ground potential, the cathode 28 of the tube 11 is returned through a resistor 29 to an adjustable source of low voltage represented by the slider 31 riding on a low value resistor 32. The resistor 32 is part of a voltage dividing arrangement, consisting of the resistors 33, 34, and 32, connected in series between the plate voltage supply B1 of the tube 11, and ground. The resistor 32 is chosen to be relatively small, so that the potential at the slider 31 is adjustable within a range a few volts above ground potential. The screen grid of the tube 11 is suitably biased by being connected between the resistors 33 and 34.

In order to allow the grid 17 of the tube 18 to swing both above and below ground potential, the grid 17 is returned to the negative source of potential B3 through a resistor 36, and a voltage dropping glow tube 19 is used to drop the voltage from the plate 16 of the tube 11 to the grid 17, by a constant amount. This permits the output voltage appearing on the terminal 24 to vary between positive and negative potentials with respect to ground.

By choosing the resistor 27 to be of value equal to (G–1) times the value of resistor 28 (where G is the gain of the amplifier without the positive feedback represented by the resistor 27), the voltage of the grid 12 may be held exactly constant, thereby resulting in perfect computational accuracy, with the relation between the signal voltage at the terminal 14 and the output voltage at the terminal 24 being determined solely by the ratio between the two impedances 13 and 26. It will be realized, of course, that in practice the inconstancy of the inherent amplifier gain will cause G to vary slightly, so that the potential of grid 12 will shift slightly over the operating range of the amplifier. It has been found, however, that the input to output ratio may be made dependent only upon the analogue impedance, to an accuracy of plus or minus one per cent.

Figure 3:
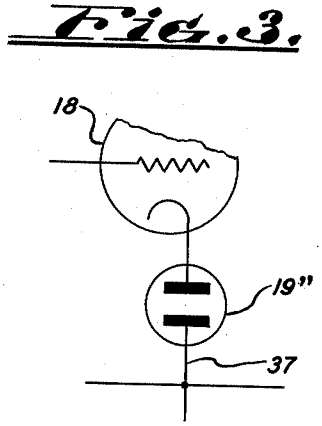

If desired, the glow tube 19 may be replaced by any suitable impedance, such as a voltage dropping resistor, 19' as shown in Fig. 2. Alternatively, the glow tube may be placed in the cathode lead 37 of the tube 18, instead of in the grid connection, as shown at 19'' in Fig. 3.

A circuit has been constructed and operated with eminently satisfactory results, having the following parameters:

Tube 11, 6AK5.

Tube 18, 6C5.

Tube 19, a gas discharge tube having a constant voltage drop of about 75 volts.

Resistor 27, 150 kilohms; resistor 36, 20 megohms; resistor 29, 1 kilohm; resistor 22, 12 kilohms; resistor 33, 70 kilohms; resistor 23, 50 kilohms; resistor 34, 15 kilohms; source B1, plus 150 volts; resistor 32, 2 kilohms; source B2, plus 200 volts; resistor 38, 1 megohm; source B3, minus 150 volts.

*Operation*

The basic operation of a circuit constructed in accordance with the drawing will now be briefly explained. Assume that the grid 12 of the tube 11 is at zero or ground potential, and that a signal voltage E1 exists on the terminal 14. The output voltage E2, at the terminal 24, is then given by the expression:

$$-E_2=Z_{26}/Z_{13}\times E1$$

Assume that the grid voltage at 12 tends to rise slightly. This is amplified through the amplifier and appears at the cathode 21 as an amplified potential change of negative sign, which is reflected through the negative feed-back impedance 26, tending to pull the voltage at 12 down again to its stable condition of zero potential. The stability of the grid voltage at 12 will be directly dependent on the gain of the amplifier. If the gain is very high, then a very small change at the grid 12 will be amplified and reflected back thru the impedance 26 in greatly amplified fashion and of opposite polarity to tend to hold the grid 12 substantially at its predetermined value of zero. Therefore, by making the overall gain of the amplifier very high, the grid 12 can be maintained substantially constant with the resulting computational accuracy as expressed by the above relationship between E1 and E2. High gain is the result of the positive feedback introduced by the resistor 27, which, if of proper value and neglecting variations in tube characteristics over the operating range, may be chosen so that the grid 12 is held at perfectly constant potential.

Not only must the grid voltage at 12 be constant, but for more simplified analogy, it should be held at zero reference, or ground, potential, with respect to E1 and E2. To achieve this the slider 31 is simply moved up and down slightly on the resistor 32, thereby lifting or lowering the potential of the cathode 28 and changing the reference level of the grid potential at 12 to the desired zero or ground value.

It is to be understood that while the amplifier described hereinbefore is particularly useful as an analogue computer or operational amplifier, it may be employed in any circuit where both high gain and good stability are required, the former being attained by the positive feedback, the latter by the negative feedback.

In addition to adaptabilty as an analogue computer, the amplifier of the instant invention has many other uses, an example of which is that of matching impedances between input and output, that is to say, as a current amplifier. In this case, the output device which is to use the output current, for example, a magnetic oscillograph element, is connected between the cathode of the tube 18 and ground and thus employs the high current flowing through the tube 18.

Introduction of positive feedback produces the high gain necessary for computational accuracy without the disadvantage of instability incurred from the use of cascaded amplifier stages.

Obviously many modifications and variations of the present invention are possible in the light of the above teachings. It is, therefore, to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An operational amplifier comprising a first tube, an impedance connected to the grid of said first tube, the other end of said impedance constituting the input terminal for the amplifier, a second tube, circuit means connecting the output appearing on the plate of said first tube to the grid of said second tube, a negative feed-back impedance connected between the cathode of said second tube and the grid of said first tube, an adjustable source of low voltage, a cathode resistor connecting the cathode of said first tube to said source, and a positive feed-back resistor connected between the respective cathodes of said tubes, of magnitude equal substantially to R(G–1), where R is the magnitude of said cathode resistor, and G is the gain of the amplifier.

2. An operational amplifier comprising a first tube, an impedance connected to the grid of said first tube, the other end of said impedance constituting the input terminal for the amplifier, a second tube, circuit means connecting the output appearing on the plate of said first tube to the grid of said second tube, a negative feedback impedance connected between the cathode of said second tube and the grid of said first tube, an adjustable source of low voltage, a cathode resistor connecting said cathode of said first tube to said source, and a positive feed-back resistor connected between the respective cathodes of said tubes.

3. An amplifier according to claim 2 wherein said circuit means includes a non-linear impedance having substantially constant voltage drop.

4. An operational amplifier comprising a first tube, an impedance connected to the grid of said first tube, the other end of said impedance constituting the input terminal for the amplifier, a second tube, circuit means connecting the output appearing on the plate of said first tube to the grid of said second tube, a negative feed-back impedance connected between the cathode of said second tube and the grid of said first tube, a cathode resistor connected between the cathode of said first tube and ground, and a positive feed-back resistor connected between the respective cathodes of said tubes, of magnitude equal substantially to R(G−1), where R is the magnitude of said cathode resistor, and G is the gain of the amplifier.

5. An operational amplifier comprising a first tube, an impedance connected to the grid of said first tube, the other end of said impedance constituting the input terminal for the amplifier, a second tube, circuit means connecting the output appearing on the plate of said first tube to the grid of said second tube, a negative feed-back impedance connected between the cathode of said second tube and the grid of said first tube, a cathode resistor connecting the cathode of said first tube and ground, and a positive feed-back resistor connected between the respective cathodes of said tubes.

6. An operational amplifier comprising a first tube, an impedance connected to the grid of said first tube, the other end of said impedance constituting the input terminal for the amplifier, a second tube, first circuit means connecting the output appearing on the plate of said first tube to the grid of said second tube, a negative feedback impedance connected between the cathode of said second tube and the grid of said first tube, a positive feed-back impedance connected between the cathode of said second tube and the cathode of said first tube, an adjustable source of low voltage, and a second circuit means returning the cathode of said first tube to said source.

7. An operational amplifier comprising a first tube, an impedance connected to the grid of said first tube, the other end of said impedance constituting the input terminal for the amplifier, a second tube, circuit means connecting the output appearing on the plate of said first tube to the grid of said second tube, a negative feed-back impedance connected between the cathode of said second tube and the grid of said first tube, and a positive feed-back impedance connected between the cathode of said second tube and the cathode of said first tube.

8. An amplifier according to claim 7 wherein said circuit means includes a non-linear impedance having substantially constant voltage drop.

9. An amplifier according to claim 7 wherein said positive feed-back impedance is a resistor.

IRVIN H. SWIFT.

REFERENCES CITED

The following references are of record in the file of this patent:

UNITED STATES PATENTS

| Number | Name | Date |
|---|---|---|
| 1,375,739 | Scriven | Apr. 26, 1921 |
| 2,282,383 | Root | May 12, 1942 |
| 2,368,454 | Dome | Jan. 30, 1945 |
| 2,386,892 | Hadfield | Oct. 16, 1945 |
| 2,411,440 | LePage | Nov. 19, 1946 |